(12) United States Patent
Hoshiyama

(10) Patent No.: US 11,919,171 B2
(45) Date of Patent: Mar. 5, 2024

(54) ROBOT CONTROLLER

(71) Applicant: FANUC CORPORATION, Yamanashi (JP)

(72) Inventor: Teppei Hoshiyama, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 311 days.

(21) Appl. No.: 16/986,262

(22) Filed: Aug. 6, 2020

(65) Prior Publication Data
US 2021/0078176 A1 Mar. 18, 2021

(30) Foreign Application Priority Data

Sep. 12, 2019 (JP) .................. 2019-166341

(51) Int. Cl.
B25J 9/16 (2006.01)
G05B 19/4155 (2006.01)

(52) U.S. Cl.
CPC ........... B25J 9/1666 (2013.01); B25J 9/1605 (2013.01); B25J 9/163 (2013.01); B25J 9/1676 (2013.01); B25J 9/1697 (2013.01); G05B 19/4155 (2013.01); G05B 2219/40512 (2013.01)

(58) Field of Classification Search
None
See application file for complete search history.

(56) References Cited

U.S. PATENT DOCUMENTS 8,315,735 B2 * 11/2012 Nihei ................. B25J 9/1676 318/568.18
2014/0371905 A1 * 12/2014 Eberst ................ G05B 19/4182 700/253
2015/0209961 A1 * 7/2015 Komatsu ................ B25J 9/1676 901/49
2017/0348856 A1 * 12/2017 Nakaya ................. B25J 9/1666
2017/0357242 A1 * 12/2017 Watanabe ............. B25J 9/1666
2018/0099408 A1 * 4/2018 Shibata ................. B25J 9/1697
2018/0257232 A1 * 9/2018 Yamamoto ............ B25J 9/1676

FOREIGN PATENT DOCUMENTS

| JP | S63-046514 A | 2/1988 |
| JP | H08-025262 A | 1/1996 |
| JP | 20188347 A | 1/2018 |
| WO | 2016103308 A1 | 6/2016 |

OTHER PUBLICATIONS

Kawasaki Robotics, Substrate Transfer—Kawasaki RS007L Robot, Youtube Video Mar. 3, 2019 https://www.youtube.com/watch?v=mLldCUUz1kQ (Year: 2019).*

* cited by examiner

Primary Examiner — Jeff A Burke
Assistant Examiner — Arslan Azhar
(74) Attorney, Agent, or Firm — HAUPTMAN HAM, LLP

(57) ABSTRACT

A robot controller for controlling motion of a robot includes a motion control unit configured to control the motion of the robot in accordance with an operation program, a motion path storage unit configured to store a motion path of a predetermined movable part of the robot when the robot operates in accordance with the operation program, a restricted motion area generation unit configured to generate restricted motion area data representing a restricted motion area for restricting the motion of the robot based on the stored motion path, and a motion restriction unit configured to restrict the motion of the robot in the restricted motion area based on the restricted motion area data.

7 Claims, 12 Drawing Sheets

ROBOT CONTROLLER

BACKGROUND OF THE INVENTION

1. Field of the Invention

The present invention relates to a robot controller.

2. Description of Related Art

In robot teaching, i.e., in generating operation commands of a robot, a user may make settings to apply a position correction automatically calculated on a robot controller to a target position serving as a reference position. For example, an operation command is set to detect a positional deviation of a workpiece with a camera, and to correct the detected positional deviation. When such setting has been made, since it is considered that the robot may move to a position different from the position intended by the user, checking of operation of the robot is generally performed through a test running. Furthermore, in consideration of the possibility that the robot may move to a position not intended by the user during the actual operation due to factors that did not occur during the test running, a restricted motion area for the robot may be set in the robot controller Japanese Unexamined Patent Publication (Kokai) No. 2018-8347 describes a robot system "comprising an imaging part which images a robot; a calculation part which acquires parameters representing a three-dimensional operation region of the robot based on a program controlling operations of the robot, creates three-dimensional shape data of the operation region of the robot using the parameters, and generates an augmented reality space by superimposing the shape data on an actual machine image of the robot based on an image of a marker for specifying the position of the robot; and a display part which displays the augmented reality space" (Abstract).

SUMMARY OF THE INVENTION

When a restricted motion area of a robot is set in the manner described above, in many cases, a teaching operator performs setting operations in a factory. It is generally not easy to generate a precise restricted motion area by the setting operations by the teaching operator. A device capable of automatically generating a precise and safe restricted motion area is desired.

An aspect of the present disclosure provides a robot controller for controlling motion of a robot, the robot controller comprising a motion control unit configured to control the motion of the robot in accordance with an operation program, a motion path storage unit configured to store a motion path of a predetermined movable part of the robot when the robot operates in accordance with the operation program, a restricted motion area generation unit configured to generate restricted motion area data representing a restricted motion area for restricting the motion of the robot based on the stored motion path, and a motion restriction unit configured to restrict the motion of the robot in the restricted motion area based on the restricted motion area data.

BRIEF DESCRIPTION OF THE DRAWINGS

The object, features, and advantages of the present invention will be elucidated by means of the description of the embodiments below referring to the attached drawings. In the attached drawings.

DETAILED DESCRIPTION

Figure 1:
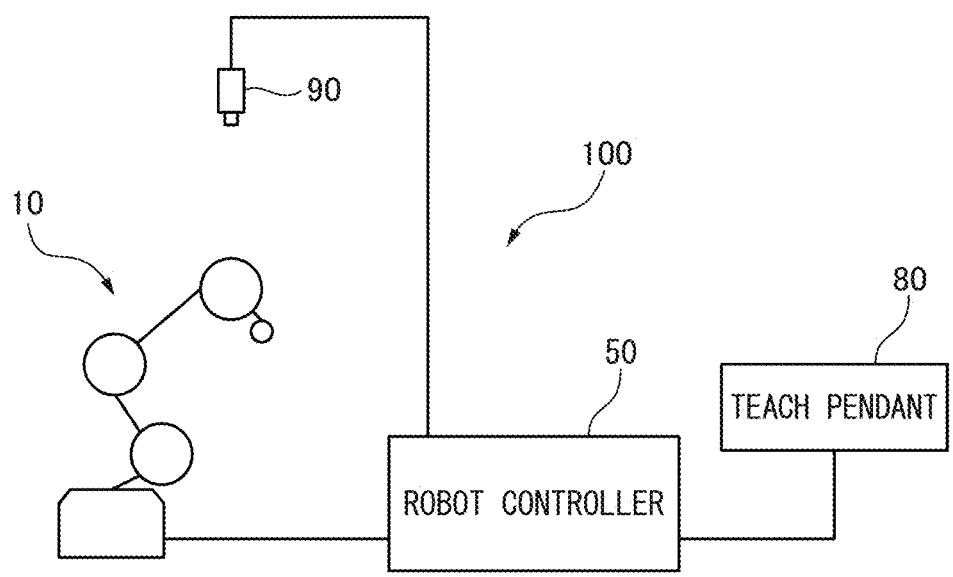
FIG. 1 is a view showing a configuration of a robot system including a robot controller according to an embodiment.

The embodiments of the present disclosure will be described below with reference to the attached drawings. In the drawings, corresponding constituent elements have been assigned common reference signs. In order to facilitate understanding, the scales of the drawings have been approximately changed. Furthermore, the forms shown in the drawings are merely examples for carrying out the present invention. The present invention is not limited to the illustrated forms.

FIG. 1 is a view showing a configuration of a robot system 100 including a robot controller 50 according to an embodiment. As shown in FIG. 1, the robot system 100 includes a robot 10, a robot controller 50 for controlling the robot 10, and a teach pendant 80 connected to the robot controller 50. Though the robot 10 is described as a vertical articulated robot, the present invention is not limited thereto. Other types of robots may be used. The teach pendant 80 includes an operation unit for performing teaching input, a display unit for displaying various information related to teaching, etc. An operator performs teaching of the robot 10 using the teach pendant 80 to generate an operation program of the robot 10.

The robot controller 50 controls the robot 10 in accordance with the operation program. Note that the robot controller 50 may have a configuration as a general computer including a CPU, a ROM, a RAM, a storage device, operation units, a display unit, an input/output interface, a network interface, etc. Furthermore, as shown in FIG. 1, the robot system 100 is provided with a vision sensor (camera) 90. The vision sensor 90 is arranged in a position from which the workpiece (not illustrated) handled by the robot 10 can be captured, and provides images in which the workpiece is detected to the robot controller 50. The robot controller 50 detects a position deviation of the workpiece based on the image obtained from the vision sensor 90, and has a function for performing position correction of the robot 10 (hereinafter this position correction will also be referred to as vision correction).

As described in detail below, the robot controller 50 stores a motion path of the robot 10, which operates in accordance with the operation program, and generates a restricted motion area of the robot 10 based on the stored motion path. The motion path is acquired as information regarding positions along which the robot 10 has actually moved. The information regarding the positions along which the robot 10 has actually moved can be obtained by various methods such as a method of calculating based on position information obtained from a servo motor of each joint of the robot 10 or a method in which positional measurement is performed by an acceleration sensor, gyro sensor, etc., attached to a predetermined part of the movable part of the robot 10. For example, storing of the motion path is executed during the test operation of the robot system 100 before the actual operation, and the restricted motion area is generated based on the stored motion path. The restricted motion area created in this manner is used as the area in which the motion of the robot 10 should be restricted during the actual operation of the robot system 100.

Figure 2:
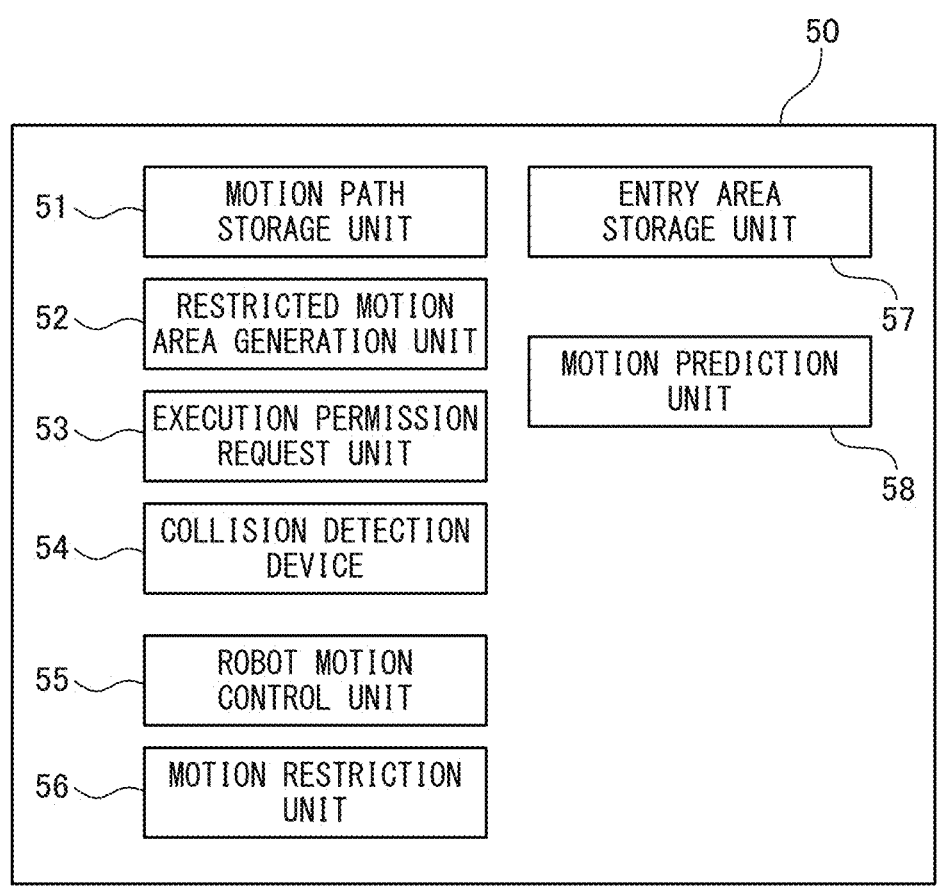
FIG. 2 is a functional block diagram of the robot controller.

FIG. 2 is a functional block diagram of the robot controller 50. The function blocks may be realized by the CPU of the robot controller 50 executing various software stored in the storage device, or may be primarily constituted by hardware such as ASIC (Application Specific Integrated Circuits). A robot motion control unit 55 controls the motion of the robot 10 in accordance with the operation program. A motion path storage unit 51 stores the motion path of the predetermined movable part of the robot 10 when the robot 10 operates in accordance with the operation program. A restricted motion area generation unit 52 generates restricted motion area data representing the restricted motion area for restricting the motion of the robot 10 based on the stored motion path. A motion restriction unit 56 uses the restricted motion area generated by the restricted motion area generation unit 52 as the area in which motion of the robot 10 should be restricted. The restriction by the motion restriction unit 56 includes stopping the movement of the robot 10 when the robot 10 intends to enter into the restricted motion area (preventing entry into the restricted motion area), and restricting the operation speed when the robot 10 has entered into the restricted motion area.

Figure 3:
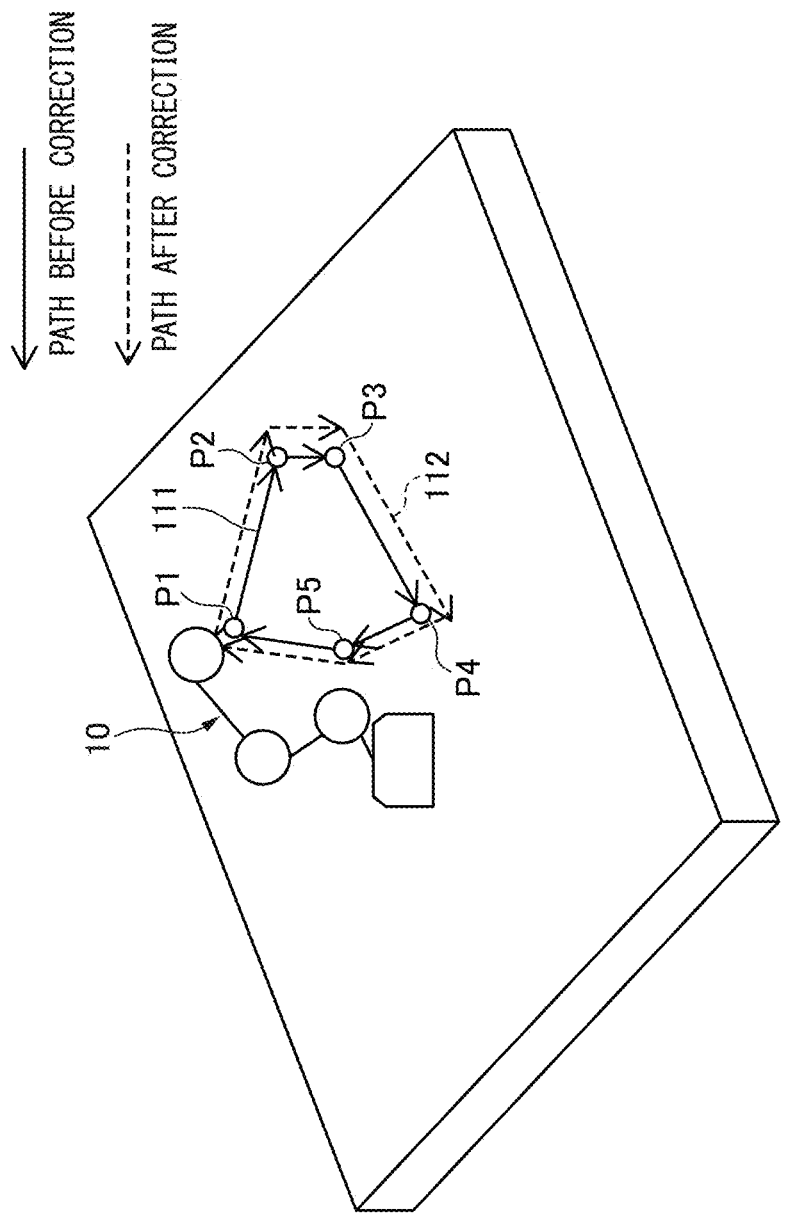
FIG. 3 is a view showing motion paths of a robot before and after correction.

The operations of the motion path storage unit 51 and the restricted motion area generation unit 52 will be described with reference to FIGS. 3 to 5. FIG. 3 shows motion paths of the robot 10. An example in which the motion path of the robot 10 is obtained as motion loci of the tool tip of the robot 10 will be described. A path 111 shown by a solid line in FIG. 3 represents a motion path along which the robot 10 has moved according to a path designated in the operation program. Assume that, by the operation program, commands to advance from a target position P1 to a target position P5 and return to the position P1 are executed. However, when position correction by vision correction or the like is additionally executed, the motion path of the robot 10 may change in some cases, as in the case of a motion path 112 shown by a dashed line in FIG. 3.

Since the correction value by vision correction or the like changes, the motion path also changes when the motion of the robot 10 is repeated. Thus, by overlapping the motion paths stored by repeatedly moving the robot 10 with each other, a motion path 113 having a certain degree of width, as shown in FIG. 4, can be obtained. The restricted motion area generation unit 52 defines the motion path 113 obtained as an area having a certain width as a movable area of the robot 10 by executing the test operation a sufficient number of times, and determines a region outside of the movable area as the restricted motion area of the robot 10. For example, the movable area may be defined as a tubular-shaped area including a plurality of stored motion paths. By generating the restricted motion area in this manner based on the motion paths along which the robot 10 has actually moved, a precise restricted motion area having high safety can be generated. Note that in the example of FIGS. 3 and 4, the restricted motion area is used as the area in which motion of the robot 10 should be restricted when the tool tip of the robot 10 has entered the restricted motion area.

Next, an example of the case in which a restricted motion area is generated based on an area in which the entire movable part of the robot 10 (the robot body) has entered will be described with reference to FIGS. 5 to 8. For example, as shown in FIG. 5, it is assumed that the robot 10 has moved from the position/posture (position P1 of the tool tip) indicated by a solid line to the position/posture (position P2 of the tool tip) indicated by a dashed line. An area 201 shown in FIG. 5 represents the area into which the entire movable part of the robot 10 has entered when the tool tip has moved from the position P1 to the position P2. An entry area storage unit 57 stores entry area data representing such an entry area 201. For example, the entry area storage unit 57 may store information (for example, information representing the position of each joint) representing the positions of the entire movable part (the robot body) of the robot 10 during the test operation of the robot 10.

In this case, the restricted motion area generation unit 52 defines, as the restricted motion area, the area outside of the movable area generated as the area into which the entire movable part (the robot bod) of the robot 10 has entered during the test operation. For example, the restricted motion area generation unit 52 may determine the area into which the entire movable part of the robot 10 has entered, by simulating a three-dimensional model of the robot 10 in a virtual space based on the position information of the entire movable part of the robot 10 stored by the motion path storage unit 51 during the test operation.

The motion restriction unit 56 restricts the motion of the robot 10 based on the restricted motion area generated by the restricted motion area generation unit 52. For example, the motion restriction unit 56 may detect whether or not the robot 10 enters into the restricted motion area by simulating a simple model of the robot 10 (for example, a model in which the joints are modeled as spheres) in a virtual space based on the position information of the robot 10 during the actual operation of the robot 10, and calculating whether or not this simple model enters into the restricted motion area.

Figure 4:
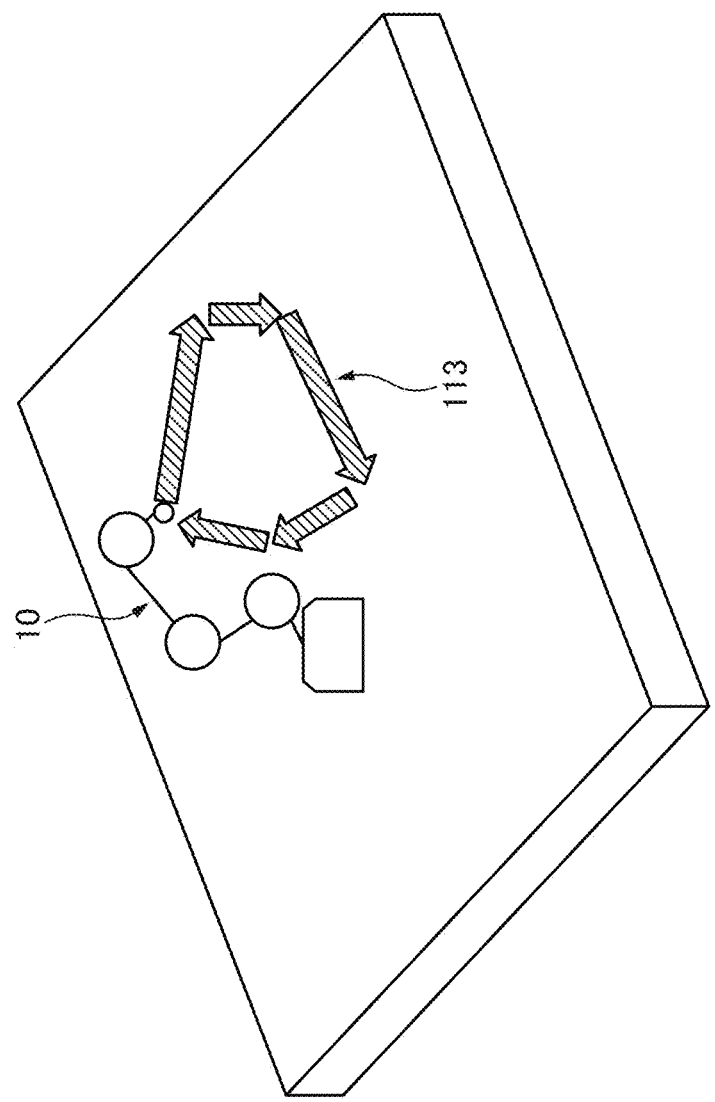
FIG. 4 is a view showing a state in which a motion path having a certain width is obtained.
Figure 5:
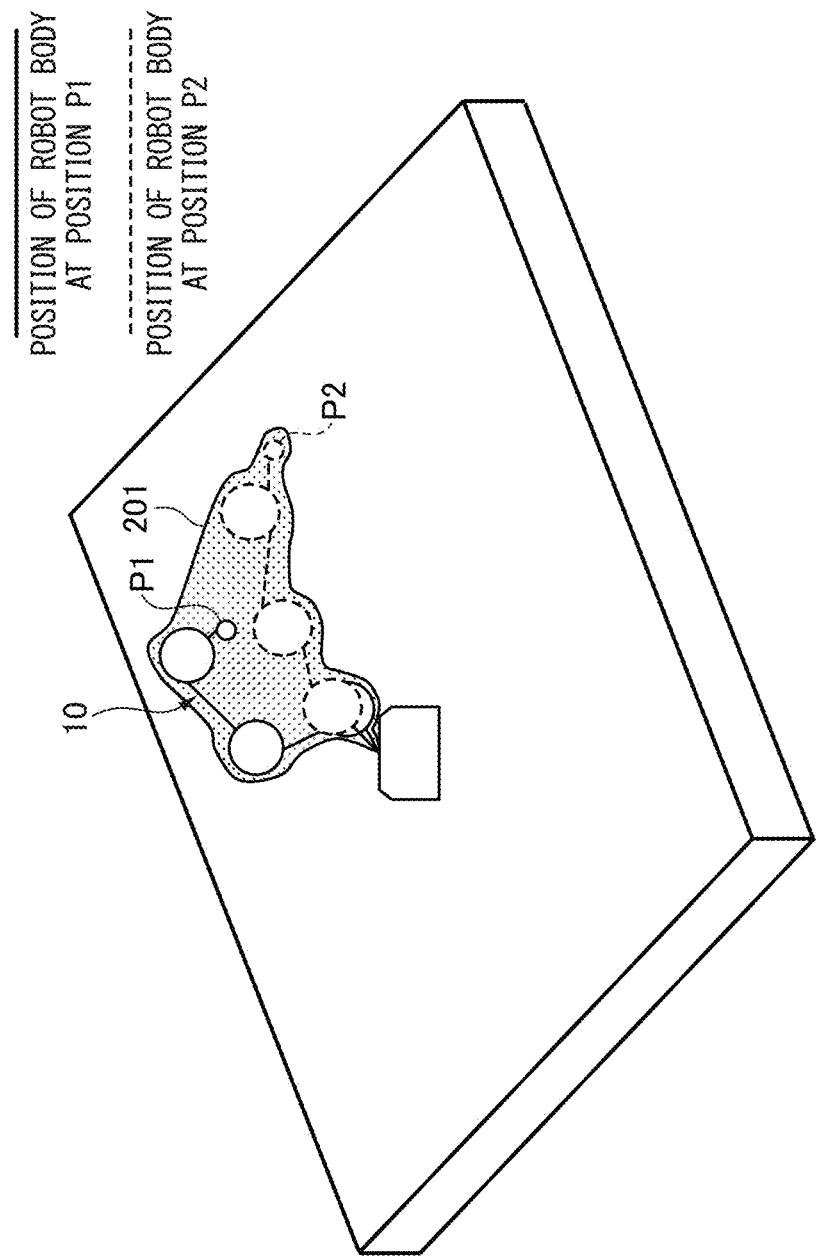
FIG. 5 is a view showing an area into which an entire movable part of the robot has entered when a tool tip moves.
Figure 6:
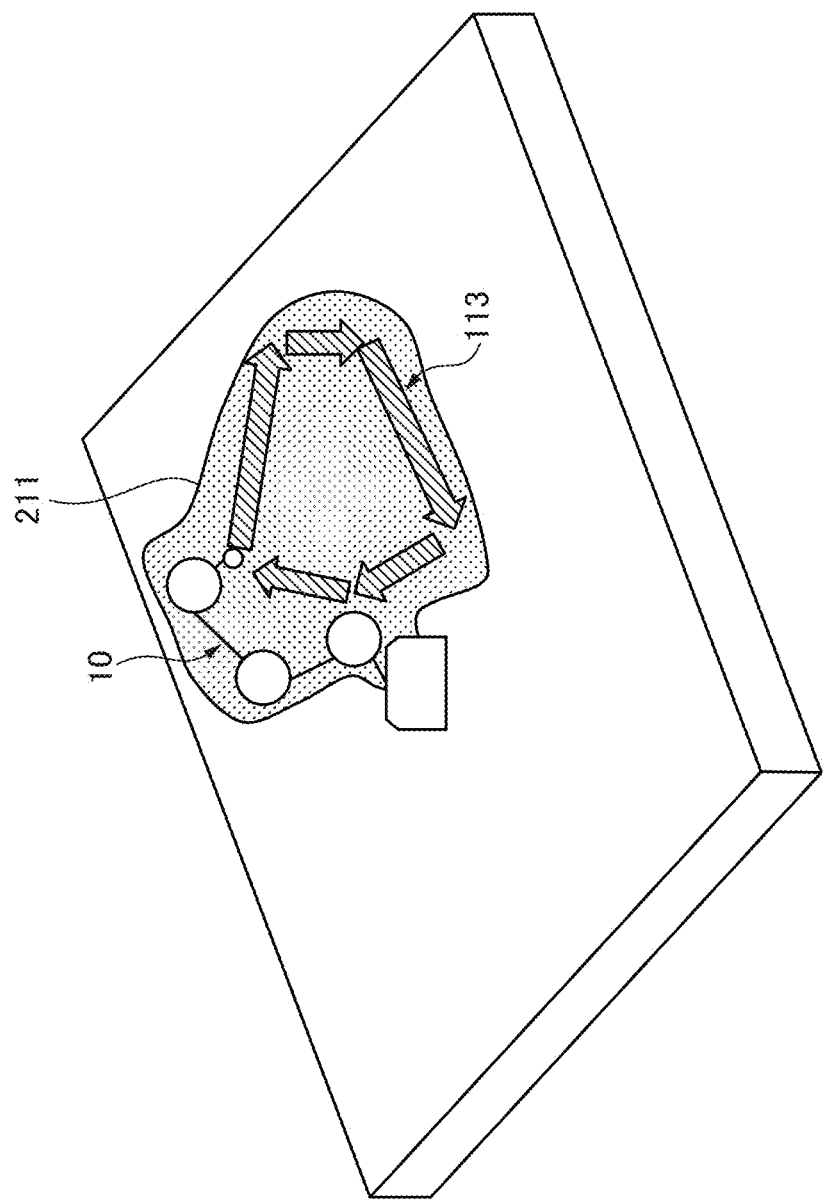
FIG. 6 is a view showing an area into which the entire movable part of the robot has entered when an operation program is repeatedly executed to obtain the motion paths of the tool tip as shown in FIG. 4.

FIG. 6 shows a motion area 211, which is an area into which the entire movable part (the robot body) of the robot 10 has entered when the operation program for acquiring the motion path 113 of the tool tip, as shown in FIG. 4, is repeatedly executed. In this case, the restricted motion area generation unit 52 generates the area outside the motion area 211 (i.e., the area into which the robot 10 has not entered) as the restricted motion area.

Figure 7:
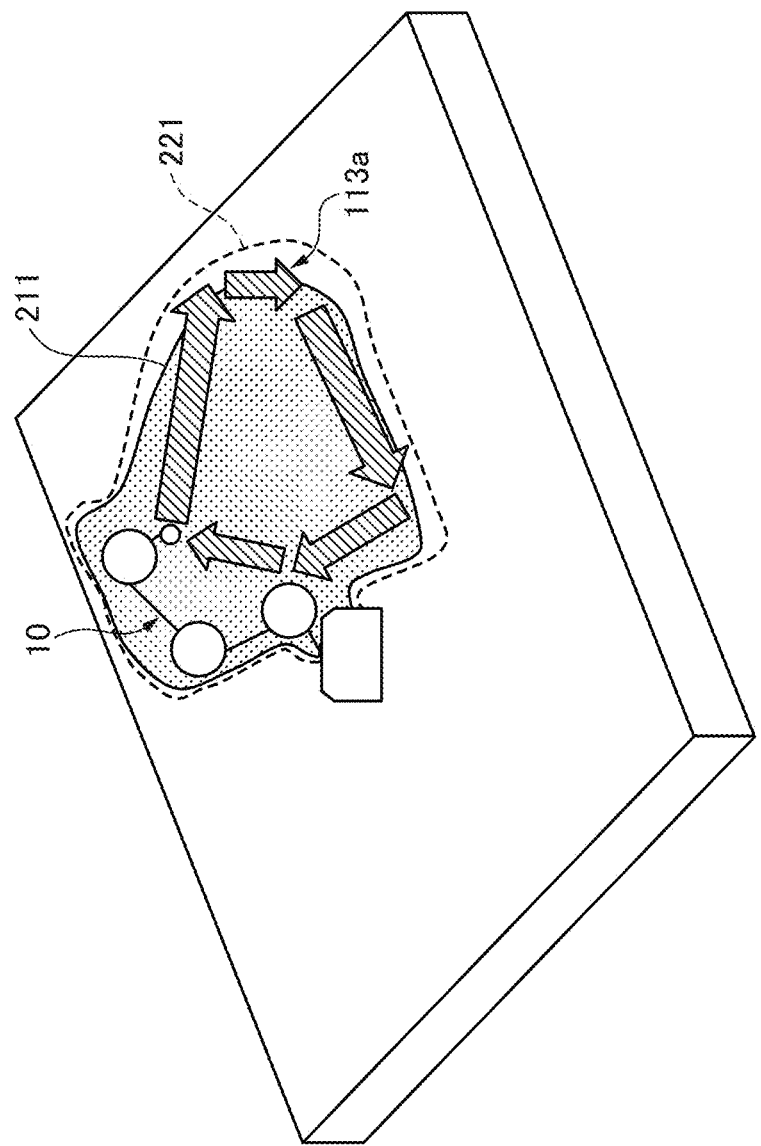
FIG. 7 is a view showing a state in which the robot enters into a restricted motion area outside of a motion area.

In the case in which the motion area 211 of the entire movable part as shown in FIG. 6 is obtained by the test operation of the robot system 100, when the robot system 100 is actually operated, a situation in which the robot 10 enters outside the motion area 211 (that is, restricted motion area), as represented by a motion path 113a in FIG. 7, may occur. In consideration of such a situation, the robot controller 50 may include a motion prediction unit 58 and an execution permission request unit 53. The motion prediction unit 58 predicts whether or not the robot 10 is supposed to enter into the restricted motion area based on the operation program. For example, when the robot 10 begins to move from the position P1 to the position P2 in accordance with the operation command, the motion prediction unit 58 predicts the motion of the robot 10 by calculating the position P2 of the movement destination of the robot 10 based on the operation command.

The execution permission request unit 53 requests an input operation by the user as to whether or not entry of the robot 10 into the restricted motion area is permitted when it is predicted by the motion prediction unit 58 that the robot 10 is supposed to enter into the restricted motion area. For example, the execution permission request unit 53 displays an input operation screen for requesting permission of entry into the restricted motion area on the teach pendant 80 when the motion prediction unit 58 predicts that the robot 10 is supposed to enter into the restricted motion area. Further, the execution permission request unit 53 permits the robot 10 to enter into the restricted motion area when an input operation for permitting entry into the restricted motion area is made by the user. Note that the robot controller 50 may stop the robot 10 at the boundary of the movable area until the user performs an input operation permitting entry into the restricted motion area.

Even in the case in which entry into the restricted motion area is thus permitted by the user, the motion restriction unit 56 reduces the operation speed of the robot 10 in the restricted motion area to a speed lower than the speed based on the operation command, in consideration of safety.

The robot controller 50 may include a collision detection device 54 for detecting collisions between the robot 10 and objects. The robot motion control unit 55 may stop the motion of the robot 10 when a collision of the robot 10 is detected by the collision detection device 54. The collision detection device 54 may have various configurations such as, for example, a configuration in which the current value of the motor of each axis of the robot 10 is detected with a sensor and it is determined that a collision has occurred when the current value exceeds a threshold value, a configuration in which a disturbance torque applied to the robot 10 is estimated by a disturbance observer, and it is determined that a collision has occurred when the disturbance torque value exceeds a threshold value, or a configuration in which the impact acting on the robot 10 is detected by an acceleration sensor or the like, and it is determined that a collision has occurred when the magnitude of the impact exceeds a threshold value. When the user permits entry into the restricted motion area, the robot motion control unit 55 (or the motion restriction unit 56) increases the sensitivity of detection of collision of the robot 10 with an object by reducing the threshold value of the collision detection device 45. As a result, safety when the robot 10 moves in the restricted motion area can be increased.

Figure 8:
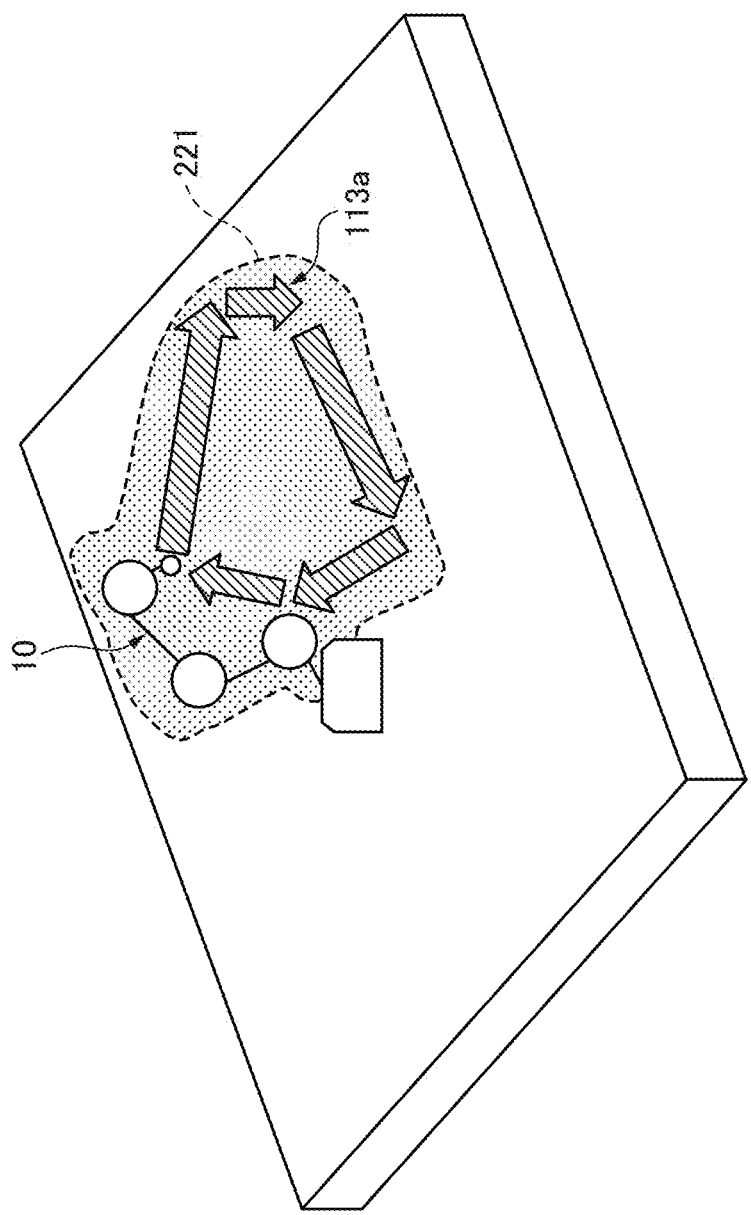
FIG. 8 is a view showing a movable area which is expanded so as to include a path that has entered outside the range of the movable area.

Note that when motion of the robot 10 is completed normally for the motion path for which the user permits entry into the restricted motion area as described above, the robot controller 50 (the restricted motion area generation unit 52) may expand the movable area so as to include the motion path. FIG. 8 shows a motion area 221 which has been expanded, so as to include the motion path 113a including a path outside the motion area 211, due to the normal execution of motion for the path outside the motion area 211, as shown in FIG. 7. Thus, when entry of the robot 10 into the restricted motion area is permitted, the restricted motion area generation unit 52 may exclude, from the restricted motion area, a motion path of the predetermined movable part of the robot 10 which has entered into the restricted motion area or an area within the restricted motion area into which the robot 10 (the entire movable part) has entered.

Figure 9:
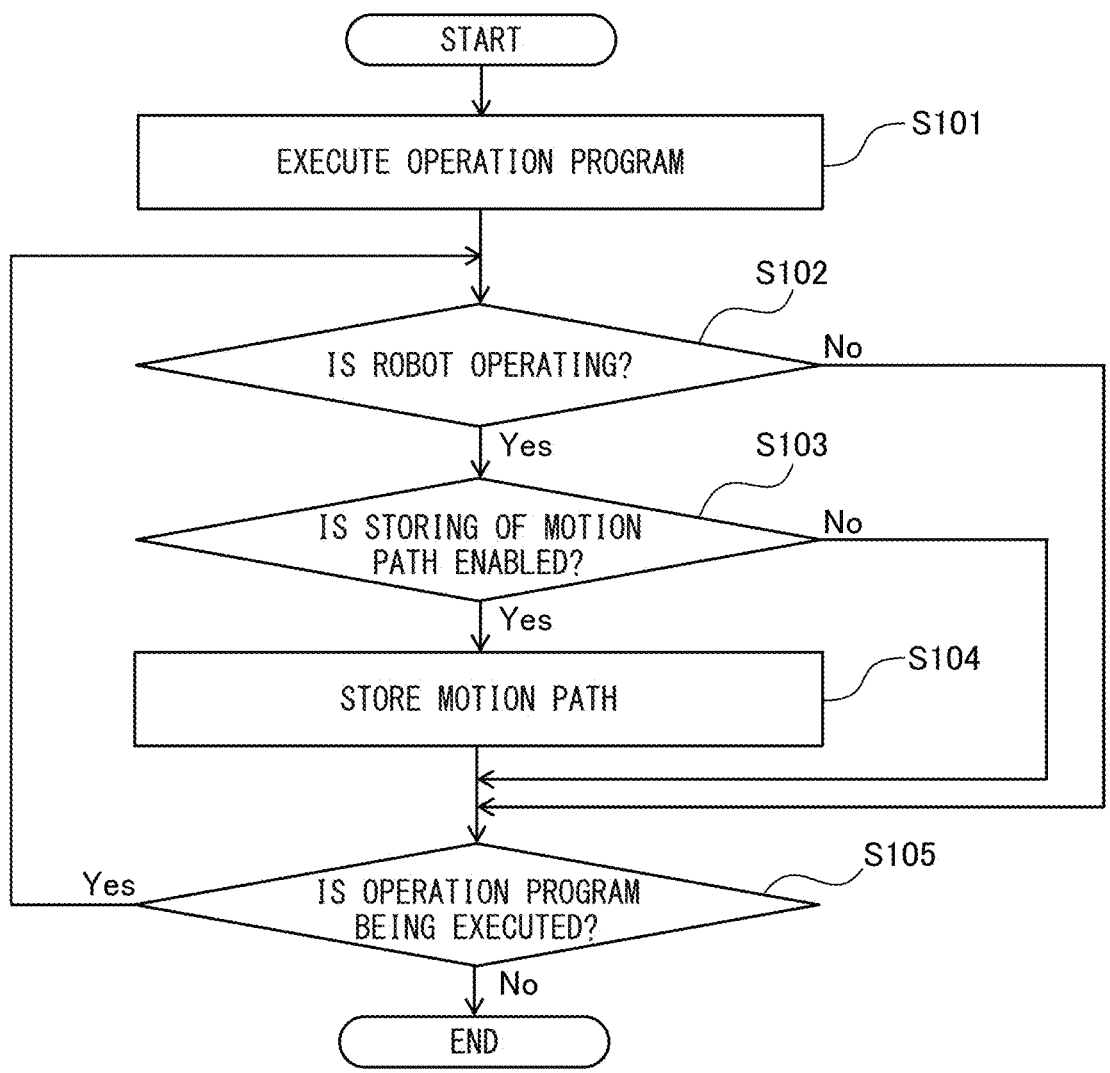
FIG. 9 is a flowchart showing a motion path storing process executed under control of a robot controller.

FIG. 9 is a flowchart showing a motion path storing process executed under control of the robot controller 50 (the motion path storage unit 51). First, the robot controller 50 executes an operation program (step S101). Next, the robot controller 50 confirms whether or not the robot 10 is operating (step S102). When the robot 10 is operating (S102: YES), the robot controller 50 confirms whether or not storing of the motion path is enabled (step S103). When the robot 10 is not operating (S102: NO), the process proceeds to S105. When it is judged in step S103 that storing of the motion path is enabled (S103: YES), the robot controller 50 stores the motion path (step S104). When storing of the motion path is not enabled (S103: NO), the process proceeds to S105.

In step S015, the robot controller 50 confirms whether or not the operation program is being executed. When the operation program is being executed (S105: YES), the process from step S102 is repeated. When the operation program is not being executed (S105: NO), the present process ends. By the above operation flow, the motion path of the robot 10 during the test operation or the like can be stored.

Figure 10:
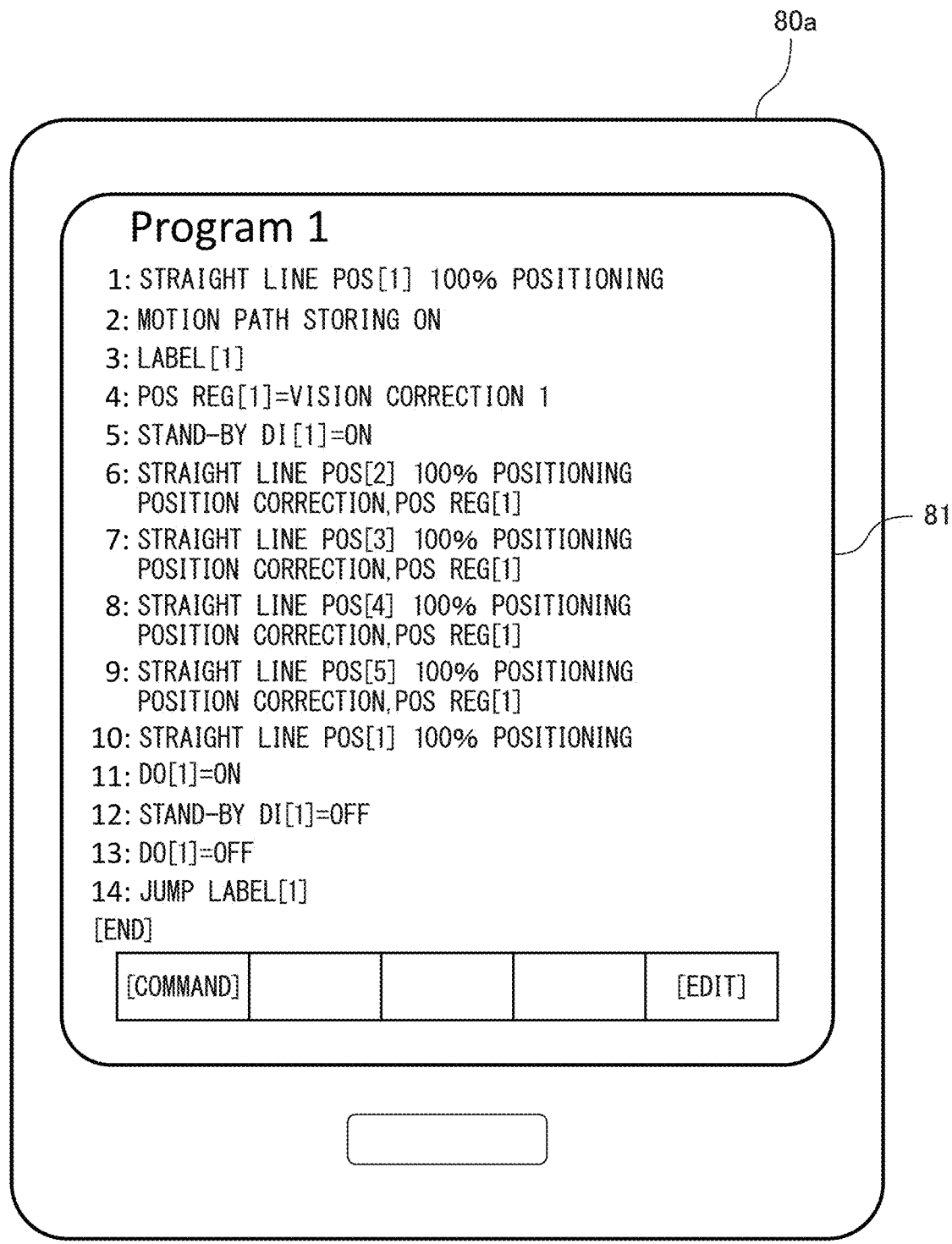
FIG. 10 is a view showing an example of an operation program for repeatedly executing the operation shown in FIG. 3.

Next, an example in which the robot 10 repeatedly executes the motion of moving from the position P1 to the position P5 and returning to the position P1 as described above with reference to FIG. 3 to store the motion path and generate the restricted motion area will be described with reference to FIGS. 10 to 12. FIG. 10 shows an example of an operation program for repeatedly executing the motion shown in FIG. 3. FIG. 10 shows a state in which the operation program (Program 1) is displayed on a display screen 81 of a tablet terminal 80a, which can be used as the teach pendant 80.

The motion when executing the operation program of FIG. 10 is as outlined below.

(1) First, the robot 10 moves to the position P1, which is the reference position (1st line in the operation program).
(2) Next, storing of a motion path is enabled (2nd line in the operation program).
(3) A vision correction value based on an image captured by the vision sensor 90 is stored in a position register (position register [1]).
(4) The robot 10 sequentially moves from the position P2 to the position P5, to each of which a vision correction value is applied, and then returns to the position P1, which is the reference position.
(5) The processes of (3) and (4) above are executed each time DI[1] is turned on (every time vision correction becomes available).

By the above processes, the robot 10 stores the motion path during execution of the operation program.

Figure 11:
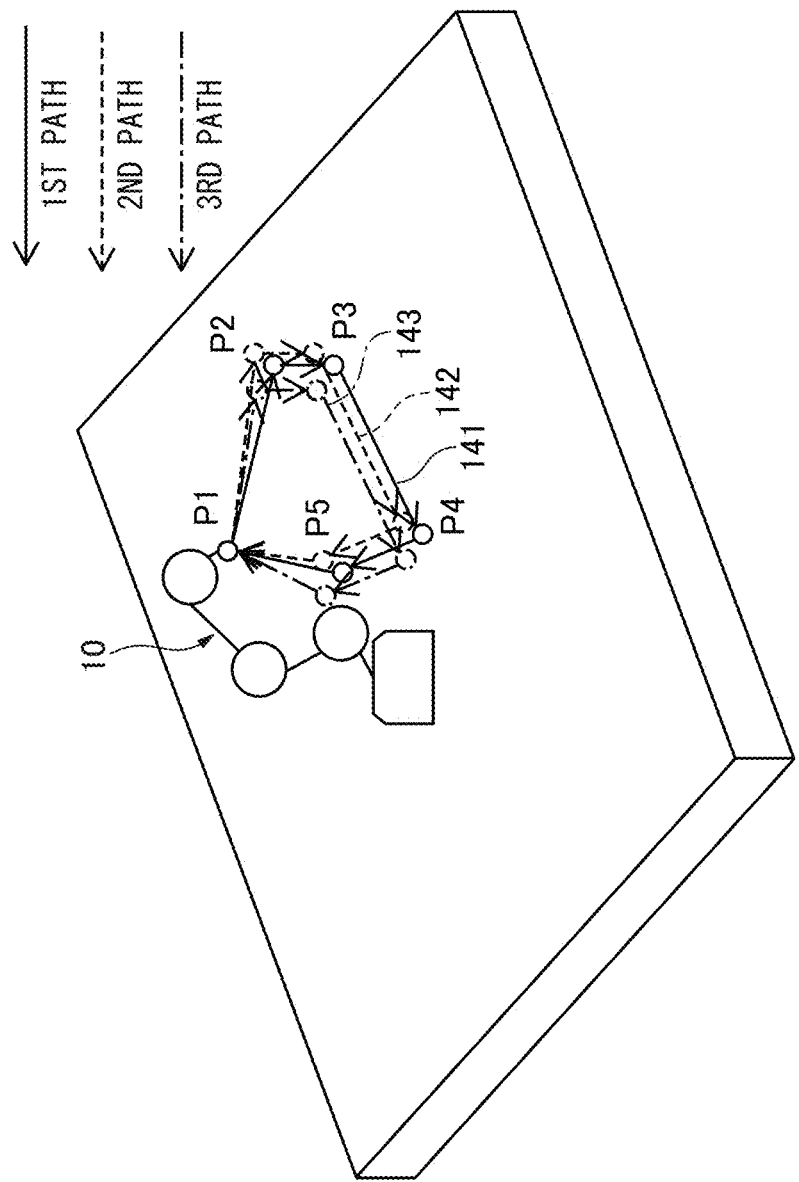
FIG. 11 is a view showing motion paths in the case in which a predetermined motion is executed three times by the robot.
Figure 12:
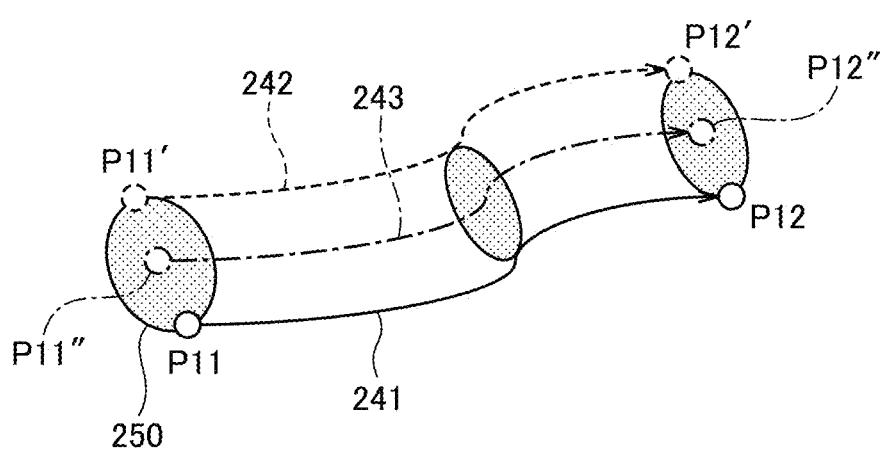
FIG. 12 illustrates a method for generating a motion path having a certain amount of thickness based on a motion path defined as a coordinate point sequence.

FIG. 11 shows motion paths in the case in which the processes of (3) and (4) described above have been repeated three times. FIG. 11 shows a first motion path 141, a second motion path 142, and a third motion path 143 obtained through the processes of (3) and (4) above. Let us consider generation of a restricted motion area based on these three motion paths. Since each motion path is defined as a coordinate point sequence in the robot coordinate system, when an area outside these motion paths is defined as the restricted motion area without change, even a path which deviates from these motion paths slightly is considered to be within the restricted motion area.

For this reason, provision of providing a certain degree of thickness based on a motion path defined as a coordinate point sequence is considered. FIG. 12 illustrates a method for generating a motion path having a certain amount of thickness based on a motion path defined as a coordinate point sequence. In FIG. 12, a motion path from position P11 to position P12 to which position correction is not applied is defined as motion path 241. A position as a result of applying position correction to position P11 is defined as position P11', a position as a result of applying position correction to position P12 is defined as position P12', and a motion path from position P11' to position P12' is defined as a motion path 242. Furthermore, a path 243 passing through the centers of the motion path 241 and the motion path 242 is generated. When the center of position P11 and position P11' is defined as position P11", position P11" is on the path 243. A circle centered on position P11" and which contacts position P11 and position P11' is defined. By generating, similar to the circle 250, circles tangent to the motion path 241 and the motion path 242 along the path 243 from position P11" to position P12", a tubular area matching the width between the motion path 241 and the motion path 242 can be generated. This tubular area 242 is never generated outside the motion path 242 (i.e., the motion path when position correction is applied). The tubular area is used as a motion path having a thickness. By defining an area outside the motion path having a thickness obtained by the above method as a restricted motion area, a precise and safe restricted motion area can be generated.

Also, regarding the case in which a plurality of motion paths have been stored in the motion path storage unit 51, by applying, for example, the above method to a reference motion path (a motion path corresponding to the motion path 241 in FIG. 12) and each of motion paths generated according to the position correction, it is possible to generate a motion path (a motion area) having a thickness containing the plurality of stored motion paths. Further, an area outside of this motion area is defined as the restricted motion area.

According to the present embodiment as described above, it is possible to automatically generate a precise and safe restricted motion area.

Though the embodiments of the present disclosure have been described above, a person skilled in the art would understand that various modifications and changes can be made without deviating from the scope disclosed in the claims below.

Though, in the above described embodiment, an example in which the restricted motion area is generated by storing the motion paths mainly through a test operation has been described, the above-described embodiment can also be applied to a configuration where a restricted motion area is generated based on motion history of the robot during, for example, the actual operation.

The program for executing the various processes such as the motion path storing process of the embodiment described above can be stored in various computer-readable recording media (e.g., semiconductor memory such as ROM, EEPROM, or flash memory, magnetic recording media, or an optical disc such as CD-ROM or DVD-ROM, etc.).

The invention claimed is:

1. A robot controller for controlling motion of a robot, the robot controller comprising:
    a motion control unit configured to control the motion of the robot in accordance with an operation program,
    a motion path storage unit configured to store a motion path of a predetermined movable part of the robot when the robot operates in accordance with the operation program,
    a restricted motion area generation unit configured to generate restricted motion area data representing a restricted motion area for restricting the motion of the robot based on the stored motion path,
    a motion restriction unit configured to restrict the motion of the robot in the restricted motion area based on the restricted motion area data,
    a motion prediction unit configured to predict whether or not the robot is supposed to enter into the restricted motion area based on the operation program, and
    an execution permission request unit configured to request an input operation as to whether or not entry of the robot into the restricted motion area is permitted when it is predicted by the motion prediction unit that the robot is supposed to enter into the restricted motion area, wherein
    the restricted motion area generation unit is configured to
        set an entry area which represents an area into which the predetermined movable part of the robot has entered when a tool attached to the robot has moved along the motion path, wherein the entry area is set by repeatedly executing the operation program for the robot while a position of the robot is corrected in response to a position deviation of a workpiece to be worked by the tool attached to the robot, the position deviation of the workpiece being detected based on an image obtained from a vision sensor in a position from which the workpiece handled by the robot is captured, and
        generate the restricted motion area outside the entry area, and
    when (i) entry of the robot into the restricted motion area is permitted and (ii) motion of the robot is completed normally for a motion path for which the entry into the restricted motion area has been permitted, the restricted motion area generation unit is configured to expand the entry area by excluding, from the restricted motion area, (a) the motion path of the predetermined movable part of the robot which has entered into the restricted motion area or (b) an area within the restricted motion area into which the robot has entered in the normally completed motion.

2. The robot controller according to claim 1, wherein restriction of the motion of the robot by the motion restriction unit includes one of preventing entry of the robot into the restricted motion area and reducing an operation speed of the robot in the restricted motion area to a speed lower than a speed based on an operation command.

3. The robot controller according to claim 1, further comprising an entry area storage unit configured to store entry area data representing, as the entry area, an area into which the entire movable part of the robot operating in accordance with the operation program has entered.

4. The robot controller according to claim 1, wherein when the input operation for permission of entry of the robot into the restricted motion area is performed via the execution permission request unit, the motion restriction unit is configured to reduce an operation speed of the robot during entry into the restricted motion area to a speed lower than a speed based on an operation command.

5. The robot controller according to claim 1, further comprising a collision detection device configured to detect collision of the robot, wherein the motion control unit is configured to stop the motion of the robot when collision of the robot is detected by the collision detection device, and the motion control unit is configured to increase a sensitivity of the collision detection device with respect to the collision during entry of the robot into the restricted motion area.

6. The robot controller according to claim 1, wherein the plurality of the motion paths stored in the motion path storage unit include a motion path caused when the position of the robot is shifted from a target position designated in the operation program due to a fact that the motion control unit executes position correction of the robot set in the operation program.

7. The robot controller according to claim 1, wherein the motion restriction unit is configured to stop the robot at a boundary between the entry area and the restricted motion area until entry of the robot into the restricted motion area is permitted.

\* \* \* \* \*